United States Patent
Reddy et al.

(10) Patent No.: US 10,740,111 B2
(45) Date of Patent: Aug. 11, 2020

(54) SYSTEM AND METHOD OF RESTORING SETTINGS OF INFORMATION HANDLING SYSTEMS

(71) Applicant: Dell Products L.P., Round Rock, TX (US)

(72) Inventors: Karunakar Palicherla Reddy, Austin, TX (US); Alok Pant, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 226 days.

(21) Appl. No.: 15/968,117

(22) Filed: May 1, 2018

(65) Prior Publication Data

US 2019/0339991 A1    Nov. 7, 2019

(51) Int. Cl.
| | |
|---|---|
| G06F 9/44 | (2018.01) |
| H04L 9/32 | (2006.01) |
| G06F 9/445 | (2018.01) |
| G06F 8/61 | (2018.01) |

(52) U.S. Cl.
CPC ........ G06F 9/44505 (2013.01); H04L 9/3247 (2013.01); G06F 8/61 (2013.01)

(58) Field of Classification Search
CPC ..... G06F 9/44505; G06F 21/00; H04L 9/3247
See application file for complete search history.

(56) References Cited

U.S. PATENT DOCUMENTS

| 7,500,090 B2 * | 3/2009 | Mondshine ........... G06F 9/4406 713/1 |
| 7,743,240 B2 * | 6/2010 | Childs ..................... G06F 9/441 713/1 |
| 7,937,701 B2 | 5/2011 | Kinney et al. |
| 10,007,552 B2 * | 6/2018 | Lewis ................... G06F 9/4806 |
| 2011/0041142 A1 * | 2/2011 | Lin ..................... G06F 9/45545 719/319 |

OTHER PUBLICATIONS

Jayakumar, Sarathy. "ACPI Based "Platform Communication Channel" (PCC) Mechanism." Intel Corporation, Oct. 2015; 15 pages.
Microsoft, "Windows Platform Binary Table (WPBT)." Retrieved from url: http://go.microsoft.com/fwlink/p/?LinkId=234840, Jul. 9, 2015; 12 pages.
Unified EFI, Inc. "Advanced Configuration and Power Interface Specification." Version 6.0, Apr. 2015; 1056 pages.

* cited by examiner

Primary Examiner — Stefan Stoynov
(74) Attorney, Agent, or Firm — Baker Botts L.L.P.

(57) ABSTRACT

In one or more embodiments, a first operating system may receive, via a first non-volatile memory medium of an information handling system, an executable file from information handling system firmware; the executable file may provide configuration information to the first operating system; the first operating system may configure the information handling system based at least on the configuration information; a second operating system may be received; the second operating system may be installed to a second non-volatile memory medium; the executable file may provide the configuration information to the second operating system; and the second operating system may configure the information handling system based at least on the configuration information.

20 Claims, 6 Drawing Sheets

SYSTEM AND METHOD OF RESTORING SETTINGS OF INFORMATION HANDLING SYSTEMS

BACKGROUND

Field of the Disclosure

This disclosure relates generally to information handling systems and more particularly to restoring settings of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, a first operating system may receive, via a first non-volatile memory medium of an information handling system, an executable file from information handling system firmware; the executable file may provide configuration information to the first operating system; the first operating system may configure the information handling system based at least on the configuration information; a second operating system may be received; the second operating system may be installed to a second non-volatile memory medium; the executable file may provide the configuration information to the second operating system; and the second operating system may configure the information handling system based at least on the configuration information. In one or more embodiments, the configuration information may include power management configuration information for the information handling system. In one example, the power management configuration information may include battery power management information for at least one battery power source of the information handling system. In a second example, the power management configuration information may include processor power management information. In another example, the power management configuration information may include system power management information. In one or more embodiments, the information handling system firmware conform with one or more portions of one or more of a Unified Extensible Firmware Interface (UEFI) and an Advanced Configuration and Power Interface (ACPI). For example, an ACPI table may include the executable file. In one instance, a Windows Platform Binary Table (WPBT) may include the ACPI table. In another instance, an ACPI table may include a WPBT. In one or more embodiments, the WPBT may permit, allow, and/or enable the executable file to be stored within information handling system firmware for execution on startup of an operating system. For example, the WPBT may permit, allow, and/or enable the executable file to persist even when an operating system has changed or been reinstalled in an unmodified configuration. For instance, the executable file may be provided to multiple operating systems of the information handling system. In one or more embodiments, the executable may be authenticated. For example, the WPBT may be authenticated via a digital signature associated with the WPBT. For instance, the executable file may be permitted to be executed by the information handling system after the WPBT is authenticated via the digital signature associated with the WPBT.

In one or more embodiments, the executable file may register a management information exchange callback service with each of multiple operating systems installed on the information handling system. In one or more embodiments, the executable file may read first configuration information of a brand manufacturer. For example, the executable file may provide the first configuration information to each of the multiple operating systems. In one or more embodiments, the executable file may read second configuration information from a first operating system of the multiple operating systems and may provide the second configuration information to a second operating system of the multiple operating systems, different from the first operating system. For example, the second configuration information may persist from one operating system to another. For instance, the second configuration information may include user input, and the user input may be utilized with the second operation system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
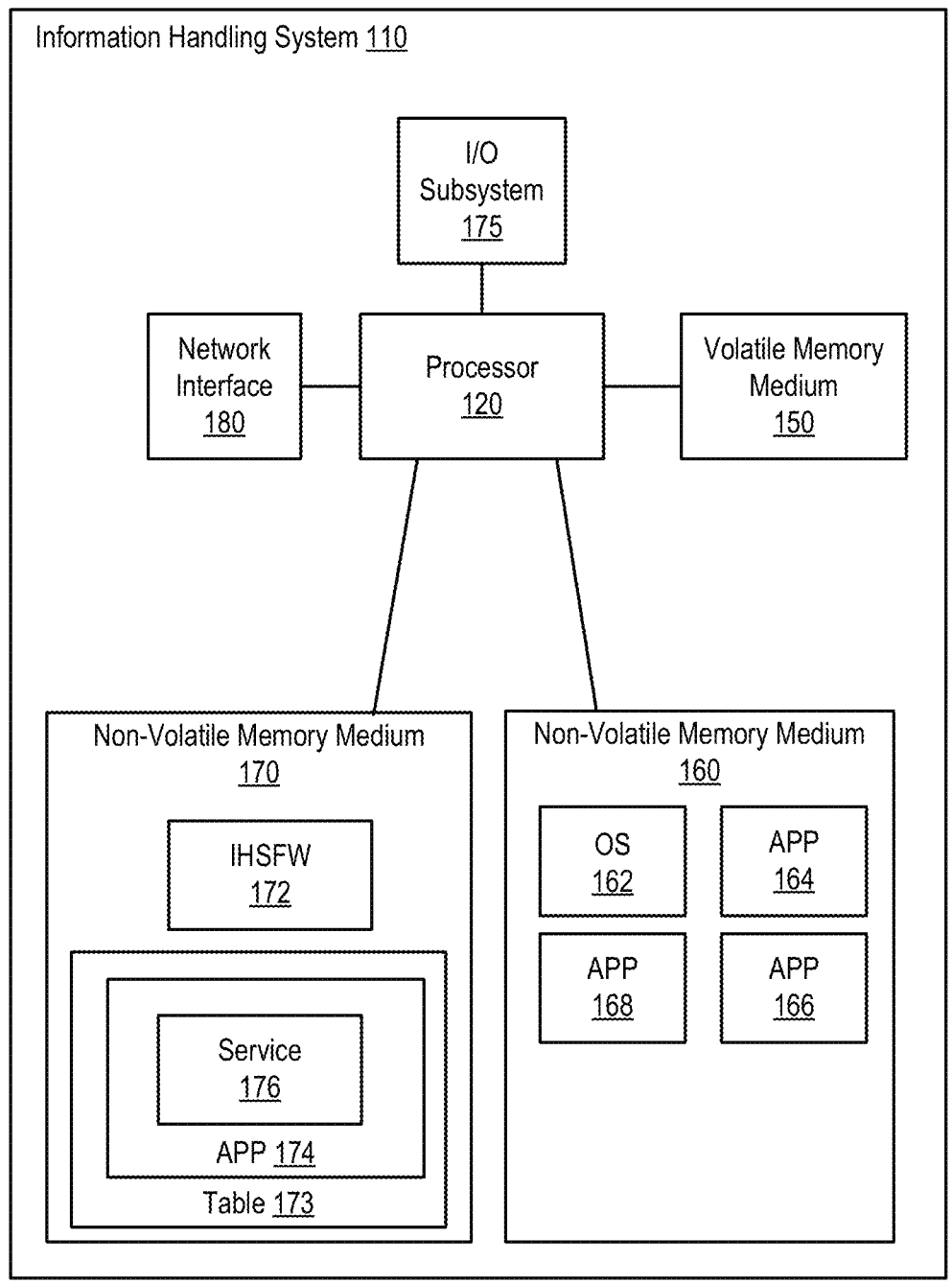
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may be configured by a brand manufacturer. For example, the brand manufacturer may be Dell Products, L.P. In one or more embodiments, a customer may re-install an operating system on the information handling system after the customer receives the information handling system from the brand manufacturer. For example, a corporation may install a customized operating system image on the information handling system. For instance, the customized operating system image may be or include a commercial operating system that the corporation has configured in a customized fashion.

In one or more embodiments, a customized operating system image and/or a generic operating system image may not include one or more configurations that may be optimized to one or more components of an information handling system. In one or more embodiments, a customized operating system image and/or a generic operating system image may not include one or more configurations that may be specific optimize to one or more components of an information handling system. For example, a customized operating system image and/or a generic operating system image may not include one or more configurations that may be specific to a power utilization configuration that is specific to a model of an information handling system. For instance, a brand manufacturer may have determined the power utilization configuration that is specific to the model of the information handling system. In one or more embodiments, an information handling system that utilizes a customized operating system image and/or a generic operating system image may benefit from power management configuration information that includes battery power management information for at least one battery power source of the information handling system. For example, the brand manufacturer may have determined the power management configuration information (e.g., optimal power management configuration information) that includes the battery power management information. For instance, determining the power management configuration information may include testing and/or determining empirical data that suits the information handling system.

In one or more embodiments, information handling system firmware may communicate information to an operating system via an Advanced Configuration and Power Interface (ACPI) table. For example, the information handling system firmware may store information in an ACPI table, and the operating system may retrieve the information from the ACPI table. For instance, the operating system may retrieve the information from the ACPI table after the operating system boots. In one or more embodiments, the ACPI table may be compiled. For example, the ACPI table may be compiled into a binary file. In one or more embodiments, the binary file (e.g., the compiled ACPI table) may be digitally signed. For example, the binary file may be digitally signed by an operating system vendor. For instance, the operating system vendor may be or include MICROSOFT. In one or more embodiments, the operating system may retrieve one or more configurations from the binary file. For example, the operating system may configure one or more settings of the operating system and/or may configure one or more components of an information handling system based at least on the one or more configurations from the binary file.

In one or more embodiments, a compiled ACPI table may provide a digitally signed executable binary file that may be loaded by an operating system. For example, the operating system may load the digitally signed executable binary during a boot up process. In one or more embodiments, the digitally signed executable binary may include one or more a native application, a service, and a user application, among others. For example, the operating system may analyze the ACPI table and may execute one or more of the native application and the service. For instance, the operating system may analyze the ACPI table and may execute one or more of the native application and the service after a digital signature verification and/or authentication of the compiled ACPI table.

In one or more embodiments, a Windows Platform Binary Table (WPBT) may permit, allow, and/or enable executable files to be stored within information handling system firmware for execution. For example, the WPBT may permit, allow, and/or enable executable files to be stored within information handling system firmware for execution on startup of an operating system. For instance, the WPBT may permit, allow, and/or enable software to persist even when an operating system has changed or has been reinstalled in an unmodified configuration. In one or more embodiments, a WPBT may be or include an ACPI table. For example, the ACPI table may be a fixed ACPI table. In one or more embodiments, a native application of a compiled ACPI table may be integrated with information handling system firmware. For example, the native application may be stored and/or integrated with the information handling system firmware. For instance, the native application may be stored and/or integrated with the information handling system firmware via the WPBT. In one or more embodiments, with a new operating system image, the native application may be executed by the new operating system image. For example, the native application may persist across different installed operating systems and/or different installed operating system images. For instance, the native application may provide configuration information to an operating system.

In one or more embodiments, the configuration information may be associated with a brand manufacturer. For example, the configuration information may include one or more configurations that may be specific to one or more components of an information handling system. For instance, the configuration information may include one or more configurations that may be specific to a model of an information handling system of the brand manufacturer. In one or more embodiments, a user may make one or more configuration changes. For example, the operating system may store the one or more configuration changes via a non-volatile memory medium. For instance, the non-volatile memory medium may store the one or more configuration changes and the information handling system firmware, among others.

Turning now to FIG. 1A, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an ACPI, among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include an implementation of one or more portions of a Windows Management Interface (WMI) for ACPI (available from Microsoft Corporation). In another instance, the management information exchange may be or include an implementation of one or more portions of a Common Information Model (CIM) (available via the Distributed Management Task Force). In one or more embodiments, the management information exchange may include a combination of an implementation of one or more portions of the WMI and an implementation of one or more portions of the CIM. For example, WMI may be and/or may be utilized as an interface to the CIM. For instance, the WMI may be utilized to provide and/or send CIM object information to OS 162.

As shown, non-volatile memory medium 170 may include a table 173. In one or more embodiments, table 173 may be or include a WPBT. For example, the WPBT may be or include an ACPI table. For instance, the ACPI table may be a fixed ACPI table. In one or more embodiments, a fixed ACPI table may be or include a compiled ACPI table. For example, a compiled ACPI table may be provided to OS 162. For instance, OS 162 may receive the compiled ACPI table and may execute one or more components of the compiled ACPI table. In one or more embodiments, table 173 may be or include a first wrapper. For example, the first wrapper may include one or more of an application (APP) 174 and a service 176. In one or more embodiments, APP 174 may be or include a second wrapper. For example, the second wrapper may include service 176. In one or more embodiments, table 173 may be signed. For example, table 173 may be signed by an operating system vendor.

In one or more embodiments, OS 162 may verify and/or authenticate a signature associated with table 173. For example, after OS 162 verifies and/or authenticates a signature associated with table 173, OS 162 may extract and/or execute APP 174. For instance, during an operating system initialization, OS 162 may read table 173 and/or obtain a memory address (e.g., memory location) of APP 174 from table 173. In one or more embodiments, APP 174 may be or include a native application that may be executed by OS 162 during an operating system initialization. For example, the native application may be or include a user-mode application. In one or more embodiments, APP 174 may setup service 176 with OS 162. In one or more embodiments, table 173 may persist across different installed operating systems and/or different installed operating system images. For example, table 173 may provide configuration information to an operating system. For instance, table 173 may provide configuration information to a newly installed operating system In one or more embodiments, processor 120 and one or more components of IHS 110 may be included in a systemon-chip (SoC). For example, the SoC may include processor 120 and a platform controller hub (not specifically illustrated).

Figure 1B:
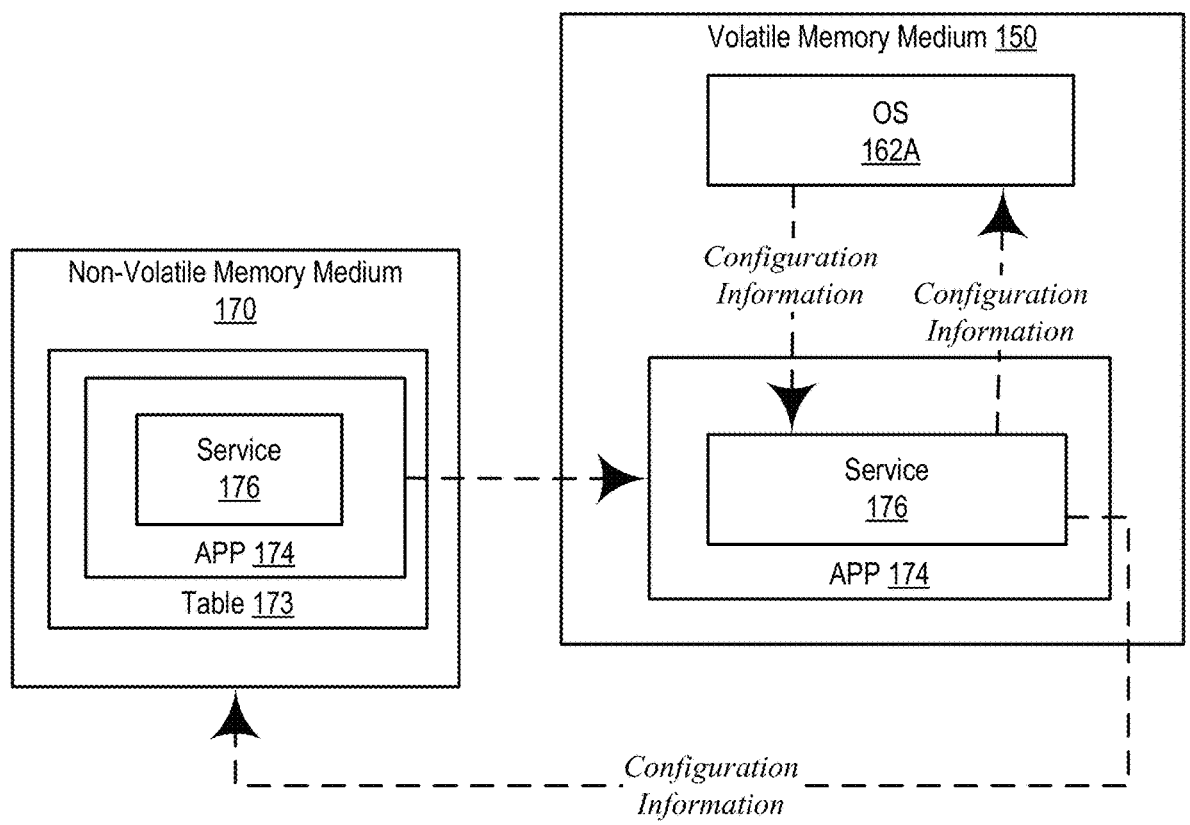
FIG. 1B illustrates an example of a table, an application, and a service, according to one or more embodiments.

Turning now to FIG. 1B, an example of a table, an application, and a service is illustrated, according to one or more embodiments. As shown, table 173 may include and/or store APP 174. In one or more embodiments, APP 174 may be transferred from non-volatile memory medium 170 to volatile memory medium 150. For example, OS 162 may transfer APP 174 from non-volatile memory medium 170 to volatile memory medium 150. For instance, OS 162 may transfer APP 174 from non-volatile memory medium 170 to volatile memory medium 150 after OS 162 verifies and/or authenticates a signature associated with table 173. In one or more embodiments, after OS 162 verifies and/or authenticates a signature associated with table 173, OS 162 may permit an executable of table 173 to be executed by processor 120. For example, after OS 162 verifies and/or authenticates a signature associated with table 173, OS 162 may permit APP 174 to be executed by processor 120. In one or more embodiments, APP 174 may include a common object file format (COFF). For example, APP 174 may be a COFF binary file.

As illustrated, OS 162 may provide configuration information to service 176. In one or more embodiments, OS 162 providing configuration information to service 176 may include service 176 intercepting the configuration information. For example, service 176 may intercept and/or acquire one or more configuration information changes. As shown, service 176 may store the configuration information via non-volatile memory medium 170. In one or more embodiments, service 176 storing the configuration information via non-volatile memory medium 170 may include utilizing a mailbox interface to store the configuration information via non-volatile memory medium 170.

In one or more embodiments, a platform communication channel (PCC) may provide one or more systems, methods, and/or processes that enables, allows, and/or permits communication between IHSFW 172 and OS 162. For example, the PCC may include a mailbox interface and/or an event interface. For instance, a mailbox may include a shared memory region. In one or more embodiments, IHSFW 172 may reserve a range of volatile memory medium 150 for the shared memory region. For example, the shared memory region may partitioned into "slots". For instance, a slot may include one or more of a signature, a command, a status, and a communication area, among others. In one or more embodiments, a mailbox may include a slot of the shared memory region. In one example, IHSFW 172 may utilize a mailbox to pass one or more parameters and/or one or more commands to OS 162 via the mailbox. In another example, OS 162 may utilize a mailbox to pass one or more parameters and/or one or more commands to IHSFW 172 via the mailbox. For instance, one or more of APP 174 and service 176, among others, may utilize a mailbox to pass one or more parameters and/or one or more commands to IHSFW 172 via the mailbox. In one or more embodiments, OS 162 or IHSFW 172 may store one or more parameters received via a mailbox. For example, OS 162 or IHSFW 172 may store one or more parameters received via the mailbox based at least on one or more commands received via the mailbox.

Figure 1C:
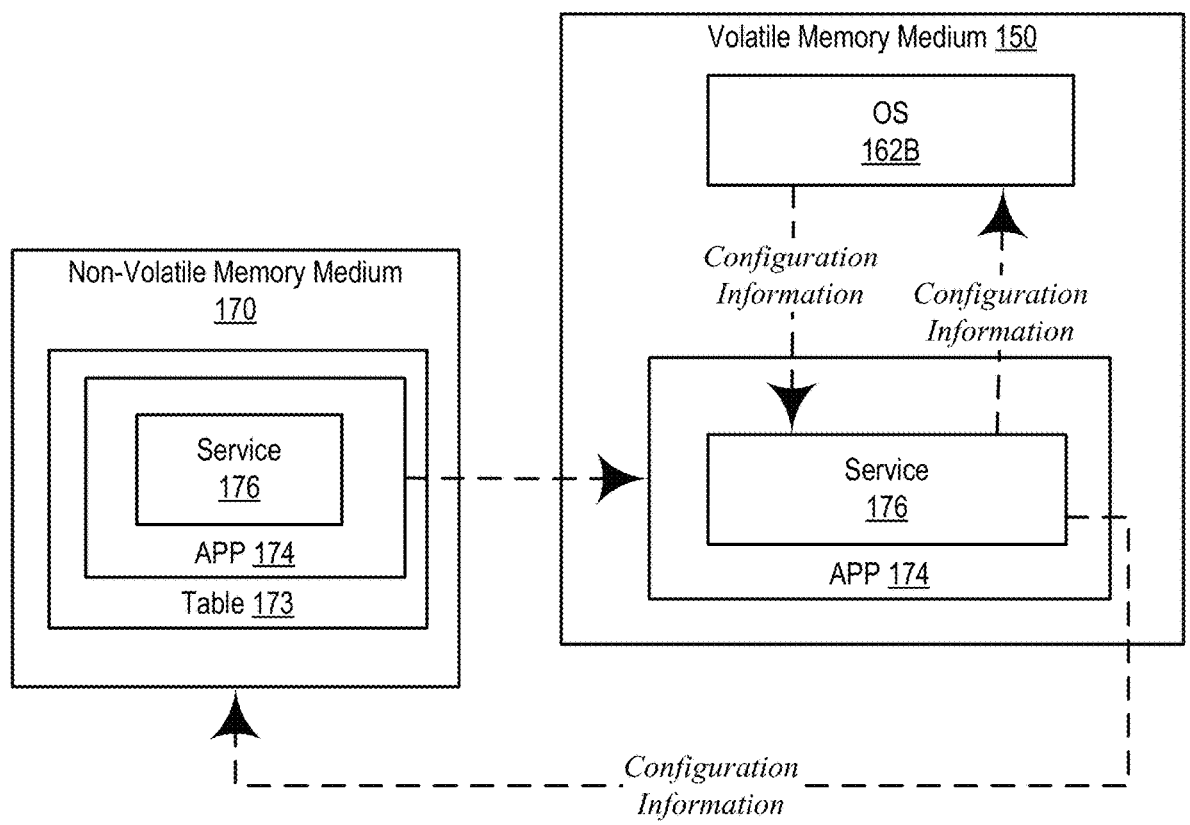
FIG. 1C illustrates another example of a table, an application, and a service that may persist with another operating system, according to one or more embodiments.

Turning now to FIG. 1C, another example of a table, an application, and a service that may persist with another operating system is illustrated, according to one or more embodiments. As illustrated, table 173 may be utilized with OS 162B as table 173 is utilized with OS 162A (illustrated in FIG. 1B). In one or more embodiments, table 173 may persist with multiple operating systems. For example, OS 162B may be installed after OS 162A was installed. For instance, although OS 162B may be a newly installed operating system, table 173 may persist with the newly installed operating system. In one or more embodiments, configuration information stored via non-volatile memory medium 170 may persist with multiple operating systems. For example, OS 162B may be installed after OS 162A was installed. For instance, although OS 162B may be a newly installed operating system, table 173 may persist with the newly installed operating system. In one or more embodiments, OS 162A and OS 162B may be different operating systems. In one example, OS 162A may be a Windows operating system and OS 162B may be a Linux operating system. In another example, OS 162A may be a Windows operating system with a first configuration and OS 162B may be the Windows operating system with a second configuration. For instance, at least a portion of the second configuration may be different from at least a portion of the first configuration.

In one or more embodiments, service 176 may read configuration information from 162A and provide the configuration information to OS 162B. For example, the configuration information may be or include user input. For instance, the configuration information, based at least on the user input, may be utilized to configure another operating system. In one or more embodiments, service 176 may store the configuration information, based at least on the user input, via one or more of non-volatile memory media 160 and 170. For example, the configuration information, based at least on the user input, may persist across multiple operating system installations.

Figure 2A:
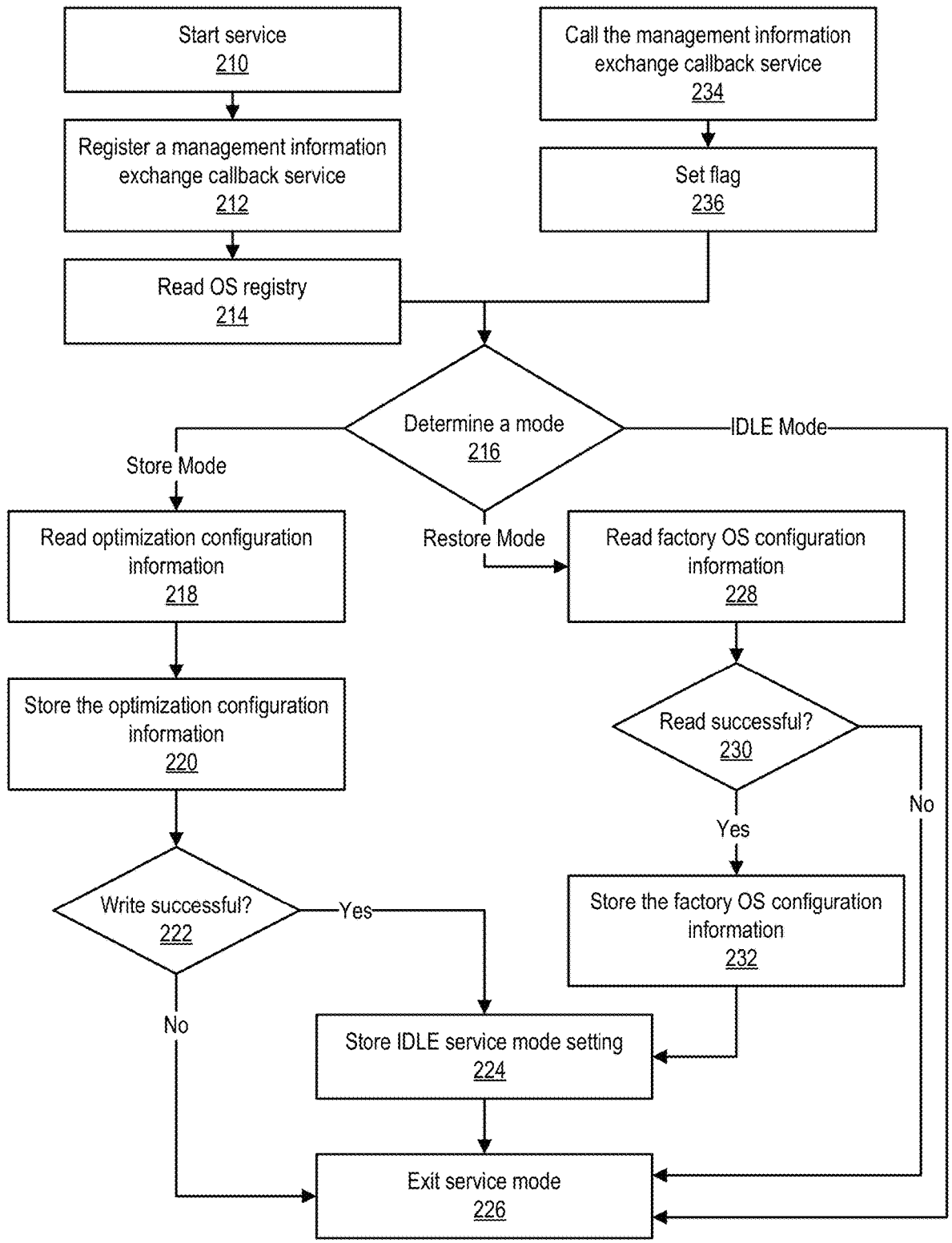
FIG. 2A illustrates an example of a method of operating an information handling system, according to one or more embodiments.

Turning now to FIG. 2A, an example of a method of operating an information handling system is illustrated, according to one or more embodiments. At 210, a service may be started. For example, APP 174 may start service 176. At 212, a management information exchange callback service may be registered. For example, the management information exchange callback service may be or include a WMI callback service. At 214, an OS registry may be read. In one or more embodiments, reading an OS registry may include accessing a memory medium and retrieving information. For example, the information may include configuration information. For instance, the configuration information may include configuration information associated with OS 162.

At 216, a mode may be determined. In one or more embodiments, the mode may be or include a restore mode, a store mode, or an idle mode, among others. In one or more embodiments, determining a mode may include accessing and/or retrieving information from a registry of OS 162. For example, the registry of OS 162 may be accessed to search for information associated with configuration information. For instance, the configuration information may be associated with a brand manufacturer. In one or more embodiments, the configuration information associated with a brand manufacturer may include a flag. For example, the registry of OS 162 may be accessed to search for a flag associated with configuration information. In one or more embodiments, if the configuration information associated with the brand manufacturer is not found, the restore mode may be determined and/or selected.

If the mode is a restore mode, optimization configuration information may be read, at 218. In one or more embodiments, reading optimization configuration information may include accessing and/or retrieving configuration information from OS 162. In one example, accessing and/or retrieving configuration information from OS 162 may include accessing and/or retrieving configuration information from a registry of OS 162. In another example, accessing and/or retrieving configuration information from OS 162 may include accessing and/or retrieving power management configuration information from OS 162. At 220, the optimization configuration information may be stored. For example, the optimization configuration information may be stored via non-volatile memory medium 170.

In one or more embodiments, an application programming interface (API) of IHSFW 172 may be utilized to store the optimization configuration information. For example, an API of a UEFI may be utilized to store the optimization configuration information. For instance, storing the optimization configuration information may include storing the optimization configuration information via non-volatile memory medium 170. In one or more embodiments, reading factory OS configuration information may include accessing and/or retrieving information from a registry of an operating system. For example, the factory OS configuration information may include one or more configurations that may be specific to one or more components of an information handling system. For instance, a brand manufacturer may have determined one or more configurations that may be specific to a model of the information handling system, and the factory OS configuration information may include the one or more configurations that may be specific to the model of the information handling system.

At 222 it may be determined if a write was successful. In one or more embodiments, determining if the write was successful may include determining if the optimization configuration information was successfully stored. If the write was successful, an "IDLE" service mode setting may be stored, at 224. In one example, the "IDLE" service mode setting may be stored via a memory medium. In another example, the "IDLE" service mode setting may be stored via a registry of OS 162. If the write was not successful, the method may proceed to 224, where a service mode may be exited.

If the mode is the restore mode, factory OS configuration information may be read, at 228. In one or more embodiments, reading factory OS configuration information may include accessing and/or retrieving information from an ACPI table. For example, the factory OS configuration information may include one or more configurations that may be specific to one or more components of an information handling system. For instance, a brand manufacturer may have determined one or more configurations that may be specific to a model of the information handling system, and the factory OS configuration information may include the one or more configurations that may be specific to the model of the information handling system.

At 230, it may be determined if the factory OS configuration information was read. If the factory OS configuration information was not read, the method may proceed to 224, according to one or more embodiments. If the factory OS configuration information was read, the factory OS configuration information may be stored, at 232. In one example, storing the factory OS configuration information may include configuring OS 162 with the factory OS configuration information. In another example, storing the factory OS configuration information may include modifying a registry of OS 162 with the factory OS configuration information. In one or more embodiments, the method may proceed to 224.

At 234, the management information exchange callback service may be called. In one or more embodiments, an operating system configuration application may call the management information exchange callback service. For example, the operating system configuration application may utilize the management information exchange callback service to communicate with IHSFW 172. For example, the operating system configuration application may utilize the management information exchange callback service to save to and/or retrieve information from non-volatile memory medium 170. In one or more embodiments, the management information exchange callback service to save to and/or retrieve information from non-volatile memory medium 170 via one or more of a WMI call, a UEFI variable, and a mailbox, among others. At 236, a flag may be set. For example, a flag in a registry associated with OS 162 may be set. For instance, the flag may be associated with a brand manufacturer. In one or more embodiments, the method may proceed to 216.

Figure 2B:
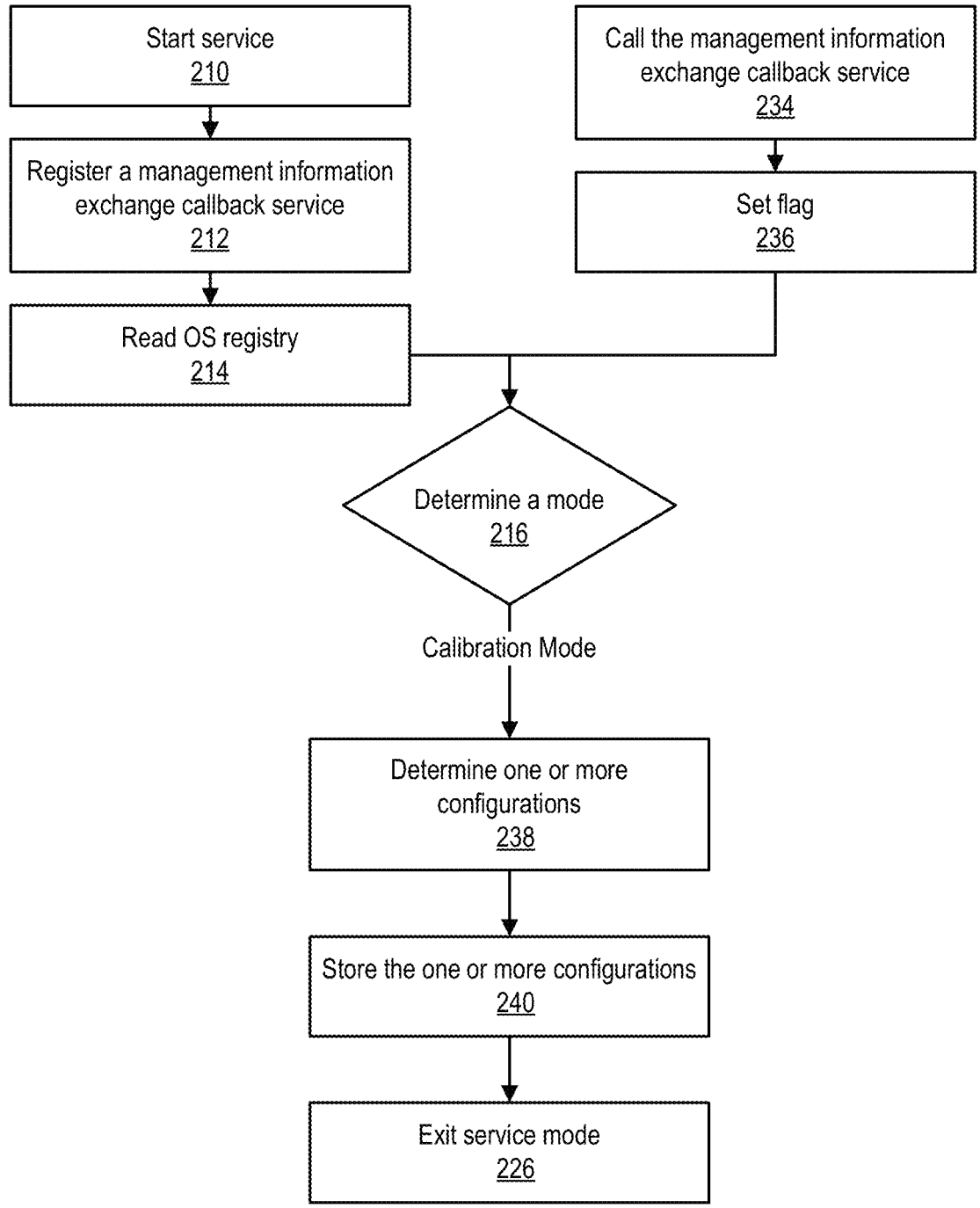
FIG. 2B illustrates an example of an optional method of operating an information handling system, according to one or more embodiments.

Turning now to FIG. 2B, an example of an optional method of operating an information handling system is illustrated, according to one or more embodiments. As illustrated, a calibration mode may be determined, at 216. If the mode is the calibration mode, one or more configurations may be determined, at 238. In one or more embodiments, determining one or more configurations may include utilizing one or more heuristic settings and/or one or more performance metrics. For example, the one or more heuristic settings and/or the one or more performance metrics may identify one or more optimal settings for an information handling system. In one or more embodiments, the one or more configurations may include the one or more optimal settings.

At 240, the one or more configurations may be stored. In one example, OS 162 may store the one or more configurations. In another example, non-volatile memory medium 170 may store the one or more configurations. For instance, the management information exchange may be utilized to save the one or more configurations to non-volatile memory medium 170. In one or more embodiments, the management information exchange may save the one or more configurations to non-volatile memory medium 170 via one or more of a WMI call, a UEFI variable, and a mailbox, among others. The method may proceed to 226, according to one or more embodiments.

Figure 3:
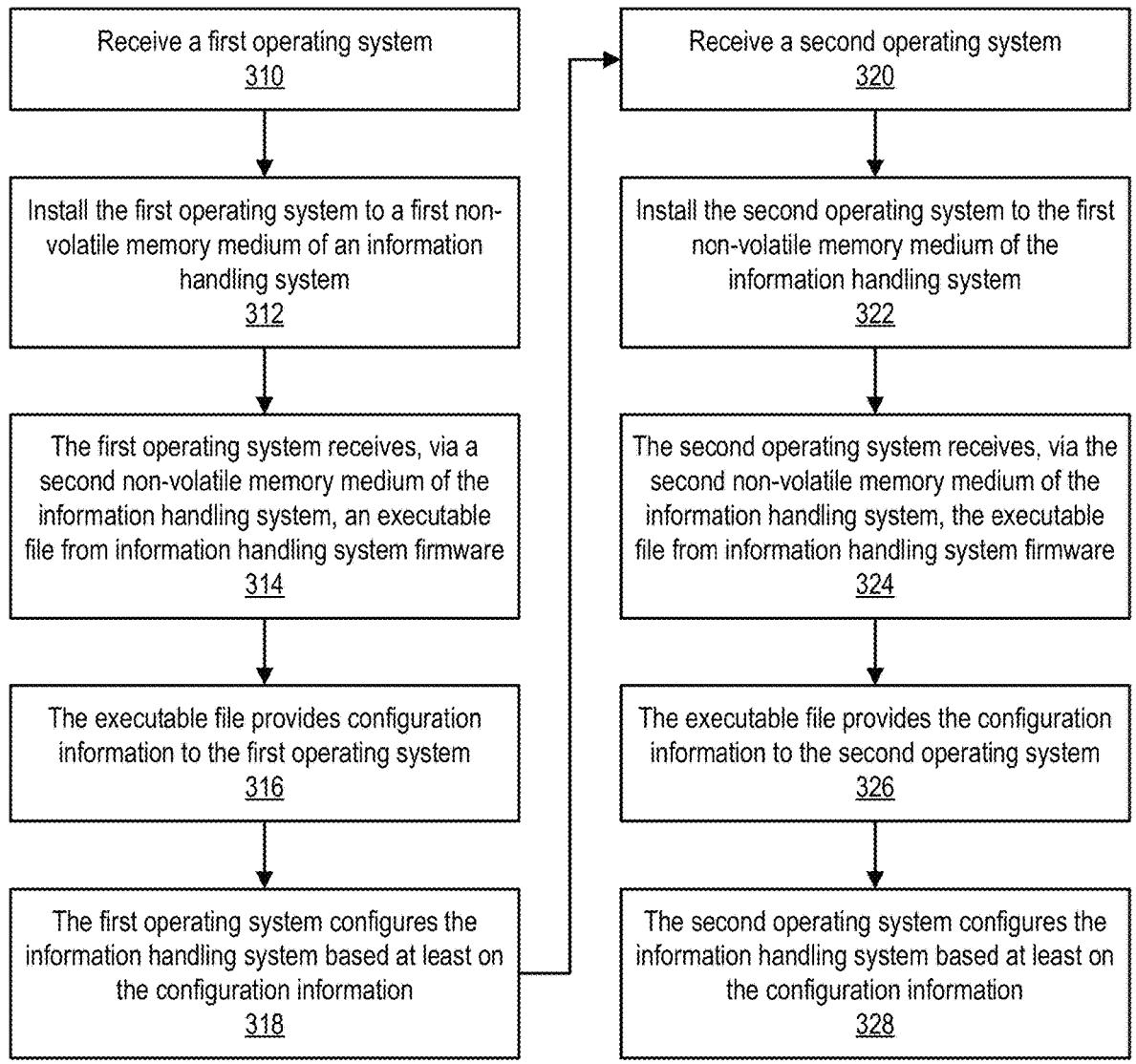
FIG. 3 illustrates a method of configuring an information handling system, according to one or more embodiments.

Turning now to FIG. 3, a method of configuring an information handling system is illustrated, according to one or more embodiments. At 310, a first operating system may be received. In one example, a first operating system may be received from one or more operating system installation media. In another example, a first operating system may be received from a network. In one or more embodiments, the first operating system may be or include OS 162A.

At 312, the first operating system may be installed to a first non-volatile memory medium of an information handling system. For example, the first operating system may be installed to non-volatile memory medium 160 of IHS 110. At 314, the first operating system may receive, via a second non-volatile memory medium of the information handling system, an executable file from information handling system firmware. For example, the first operating system may receive, via non-volatile memory medium 170 of IHS 110, an executable file from IHSFW 172. In one instance, the executable file may be or include APP 174. In another instance, the executable file may be or include APP 164.

At 316, the executable file may provide configuration information to the first operating system. In one example, APP 174 may provide configuration information to the first operating system. In another example, APP 164 may provide configuration information to the first operating system. In one or more embodiments, providing configuration information to the first operating system may include setting and/or configuring one or more portions of a registry associated with the first operating system. At 318, the first operating system may configure the information handling system based at least on the configuration information. In one or more embodiments, the configuration information may include power management configuration information for the information handling system. In one example, the power management configuration information may include battery power management information for at least one battery power source of the information handling system. For instance, the information handling system may be a specific model of a brand manufacturer, and the battery power management information may be specific to the specific model of the brand manufacturer. In a second example, the power management configuration information may include processor power management information. In another example, the power management configuration information may include system power management information. In one or more embodiments, the configuration information may be stored via non-volatile memory medium 170. For example, providing the configuration information to the first operating system may include providing the configuration information from non-volatile memory medium 170 to the first operating system.

At 320, a second operating system may be received. In one example, a second operating system may be received from one or more operating system installation media. In another example, a second operating system may be received from a network. In one or more embodiments, the second operating system may be or include OS 162B. At 322, the second operating system may be installed to the first non-volatile memory medium of the information handling system. For example, the second operating system may be installed to non-volatile memory medium 160 of IHS 110. At 324, the second operating system may receive, via the second non-volatile memory medium of the information handling system, the executable file from information handling system firmware. For example, the second operating system may receive, via non-volatile memory medium 170 of IHS 110, an executable file from IHSFW 172. In one instance, the executable file may be or include APP 174. In another instance, the executable file may be or include APP 164.

At 326, the executable file may provide the configuration information to the second operating system. In one example, APP 174 may provide the configuration information to the second operating system. In another example, APP 164 may provide the configuration information to the second operating system. In one or more embodiments, providing the configuration information to the second operating system may include setting and/or configuring one or more portions of a registry associated with the second operating system. At 328, the second operating system may configure the information handling system based at least on the configuration information. In one or more embodiments, the configuration information may include power management configuration information for the information handling system. For example, the power management configuration information may include battery power management information for at least one battery power source of the information handling system. For instance, the information handling system may be a specific model of a brand manufacturer, and the battery power management information may be specific to the specific model of the brand manufacturer. In one or more embodiments, the configuration information may be stored via non-volatile memory medium 170. For example, providing the configuration information to the second operating system may include providing the configuration information from non-volatile memory medium 170 to the second operating system.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a first non-volatile memory medium that is coupled to the at least one processor and that includes information handling system firmware that includes an executable file;
   a second non-volatile memory medium that is coupled to the at least one processor and that includes a first operating system;
   wherein the first operating system, when executed by the at least one processor, causes the information handling system to:
      receive, via the first non-volatile memory medium of the information handling system, the executable file from information handling system firmware;
   wherein the executable file, when executed by the at least one processor, causes the information handling system to:
      provide configuration information to the first operating system;
   wherein the first operating system, when executed by the at least one processor, causes the information handling system to:
      configure the information handling system based at least on the configuration information;
   wherein the information handling system firmware, when executed by the at least one processor, causes the information handling system to:
      receive a second operating system; and
      install the second operating system to the second non-volatile memory medium;

wherein the executable file, when executed by the at least one processor, causes the information handling system to:
   provide the configuration information to the second operating system; and
wherein the second operating system, when executed by the at least one processor, causes the information handling system to:
   configure the information handling system based at least on the configuration information.

2. The information handling system of claim 1, wherein the information handling system firmware conforms with one or more of a Unified Extensible Firmware Interface (UEFI) and an Advanced Configuration and Power Interface (ACPI).

3. The information handling system of claim 2,
   wherein the information handling system firmware conforms to the ACPI; and
   wherein an ACPI table includes the executable file.

4. The information handling system of claim 1, wherein the configuration information includes power management configuration information for the information handling system.

5. The information handling system of claim 4, wherein the power management configuration information includes at least one of battery power management information for at least one battery power source of the information handling system, processor power management information, and system power management information.

6. The information handling system of claim 1, wherein the second operating system, when executed by the at least one processor, further causes the information handling system to:
   authenticate the executable file via a digital signature associated with the executable file; and
   after authenticating the executable file, permit the at least one processor to execute the executable file.

7. The information handling system of claim 1, wherein the executable file, when executed by the at least one processor, further causes the information handling system to:
   determine one or more settings of the second operating system; and
   store the one or more settings of the second operation system in the first non-volatile memory medium.

8. A method, comprising:
   a first operating system receiving, via a first non-volatile memory medium of an information handling system, an executable file from information handling system firmware;
   the executable file providing configuration information to the first operating system;
   the first operating system configuring the information handling system based at least on the configuration information;
   receiving a second operating system;
   installing the second operating system to a second non-volatile memory medium;
   the executable file providing the configuration information to the second operating system; and
   the second operating system configuring the information handling system based at least on the configuration information.

9. The method of claim 8, wherein the information handling system firmware conforms with one or more of a Unified Extensible Firmware Interface (UEFI) and an Advanced Configuration and Power Interface (ACPI).

10. The method of claim 9,
    wherein the information handling system firmware conforms with the ACPI; and
    wherein an ACPI table includes the executable file.

11. The method of claim 8, wherein the configuration information includes power management configuration information for the information handling system.

12. The method of claim 11, wherein the power management configuration information includes at least one of battery power management information for at least one battery power source of the information handling system, processor power management information, and system power management information.

13. The method of claim 8, further comprising:
    the second operating system authenticating the executable file; and
    after the second operating system authenticating, via a digital signature, the executable file, at least one processor of the information handling system executing the executable file.

14. The method of claim 8, further comprising:
    the executable file determining one or more settings of the second operating system; and
    the executable file storing the one or more settings of the second operation system in the first non-volatile memory medium.

15. At least one computer-readable non-transitory memory medium that includes instructions that, when executed by at least one processor of an information handling system, cause the information handling system to:
    register a management information exchange callback service with each of a plurality of operating systems installed on the information handling system;
    read first configuration information of a brand manufacturer;
    provide the first configuration information to each of the plurality of operating systems;
    read second configuration information from a first operating system of the plurality of operating systems; and
    provide the second configuration information to a second operating system of the plurality of operating systems, different from the first operating system.

16. The at least one computer-readable non-transitory memory medium of claim 15, wherein the management information exchange includes at least a portion of an implementation of at least one of a Windows Management Interface (WMI) and a Common Information Model (CIM).

17. The at least one computer-readable non-transitory memory medium of claim 15, wherein an Advanced Configuration and Power Interface (ACPI) table includes the instructions.

18. The at least one computer-readable non-transitory memory medium of claim 17,
    wherein the ACPI table is configured to be authenticated by the plurality of operating systems via a digital signature associated with the ACPI table.

19. The at least one computer-readable non-transitory memory medium of claim 15, wherein the first configuration information includes power management configuration information for the information handling system.

20. The at least one computer-readable non-transitory memory medium of claim 19, wherein the power management configuration information includes at least one of battery power management information for at least one battery power source of the information handling system, processor power management information, and system power management information.

* * * * *